US012784987B2

(12) United States Patent
Lee et al.

(10) Patent No.: US 12,784,987 B2
(45) Date of Patent: Nov. 3, 2026

(54) MULTILAYER CERAMIC CAPACITOR AND METHOD OF MANUFACTURING THE SAME

(71) Applicant: SAMSUNG ELECTRO-MECHANICS CO., LTD., Suwon-si (KR)

(72) Inventors: Myungwoo Lee, Suwon-si (KR); Jaemin Han, Suwon-si (KR); Jinseong Kim, Suwon-si (KR); Yongju Yoo, Suwon-si (KR); Hyungjoon Jeon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 201 days.

(21) Appl. No.: 18/623,974

(22) Filed: Apr. 1, 2024

(65) Prior Publication Data

US 2025/0132095 A1 Apr. 24, 2025

(30) Foreign Application Priority Data

Oct. 18, 2023 (KR) ........................ 10-2023-0139604

(51) Int. Cl.

| | |
|---|---|
| ***H01G 4/30*** | (2006.01) |
| ***H01G 4/12*** | (2006.01) |
| ***H01G 4/232*** | (2006.01) |

(52) U.S. Cl.

CPC ............. *H01G 4/30* (2013.01); *H01G 4/1227* (2013.01); *H01G 4/232* (2013.01)

(58) Field of Classification Search

CPC ......... H01G 4/30; H01G 4/232; H01G 4/1227
USPC ..... 361/301.4, 311, 321.1, 321.4, 312, 321.5
See application file for complete search history.

(56) References Cited

U.S. PATENT DOCUMENTS

| | | | | |
|---|---|---|---|---|
| 12,512,264 | B2 * | 12/2025 | Park | C04B 35/4682 |
| 2009/0137071 | A1 * | 5/2009 | Subramanian | G06K 19/067 438/22 |
| 2009/0264276 | A1 | 10/2009 | Yamashita et al. | |
| 2020/0303125 | A1 * | 9/2020 | Tsuru | H01G 4/1227 |
| 2020/0411240 | A1 * | 12/2020 | Ham | H01G 4/012 |
| 2021/0159014 | A1 * | 5/2021 | Kowase | H01G 4/33 |
| 2023/0046574 | A1 * | 2/2023 | Yamaguchi | C04B 35/4682 |

FOREIGN PATENT DOCUMENTS

| | | | |
|---|---|---|---|
| CN | 106747416 | A | 5/2017 |
| JP | 4691977 | B | 6/2006 |
| JP | 4525788 | B | 6/2010 |
| KR | 10-0957528 | B1 | 5/2010 |

* cited by examiner

*Primary Examiner* — Arun Ramaswamy
(74) *Attorney, Agent, or Firm* — Morgan, Lewis & Bockius LLP

(57) ABSTRACT

A multilayer ceramic capacitor including: a capacitor body including a dielectric layer and an internal electrode layer; and an external electrode arranged outside the capacitor body, wherein the dielectric layer includes a barium titanate-based main ingredient and an element of phosphorus (P), and the element of phosphorus (P) is included in an amount of 0.006 parts by mole to 0.23 parts by mole based on 100 parts by mole of the barium titanate-based main ingredient, and a manufacturing method thereof are provided.

14 Claims, 6 Drawing Sheets

MULTILAYER CERAMIC CAPACITOR AND METHOD OF MANUFACTURING THE SAME

CROSS-REFERENCE TO RELATED APPLICATION

This application claims priority to and the benefit of Korean Patent Application No. 10-2023-0139604 filed in the Korean Intellectual Property Office on Oct. 18, 2023, the entire contents of which are incorporated herein by reference.

BACKGROUND OF THE INVENTION

(a) Field of the Invention

The present disclosure relates to a multilayer ceramic capacitor and a method of manufacturing the same.

(b) Description of the Related Art

Electronic components using ceramic materials include capacitors, inductors, piezoelectric elements, varistors, or thermistors. Among such ceramic electronic components, a multilayer ceramic capacitor (MLCC) may be used in various electronic devices due to its small size, high capacity, and easy mounting.

For example, the multilayer ceramic capacitor may be used for chip-type capacitors that are mounted in boards of various electronic products to charge or discharge electricity, including imaging devices such as liquid crystal displays (LCD), plasma display panels (PDP), and organic light-emitting diode (OLED) displays, computers, personal portable terminals, and smartphones.

In particular, due to the advancement of automobile electronic control technology, MLCC demands for vehicular applications is increasing, and as the down-sizing and high-functionality of vehicular electronic devices progresses, high capacity, high temperature, and moisture resistance characteristics of the MLCC are being required.

SUMMARY OF THE INVENTION

The present disclosure attempts to provide a multilayer ceramic capacitor with excellent reliability such as high temperature or moisture resistance and a withstand voltage characteristic.

The present disclosure attempts to provide a method of manufacturing the multilayer ceramic capacitor.

An embodiment of the present disclosure provides a multilayer ceramic capacitor including: a capacitor body including a dielectric layer and an internal electrode layer; and an external electrode arranged outside the capacitor body, wherein the dielectric layer includes a barium titanate-based main ingredient and an element of phosphorus (P), and the element of phosphorus (P) is included in an amount of 0.006 parts by mole to 0.23 parts by mole based on 100 parts by mole of the barium titanate-based main ingredient.

The dielectric layer may include a plurality of dielectric grains, and the dielectric grains may include the barium titanate-based main ingredient and the element of phosphorus (P).

A D10 diameter of the dielectric grain may be 100 nm to 140 nm.

A D50 diameter of the dielectric grain may be 150 nm to 250 nm.

A D90 diameter of the dielectric grain may be 300 nm to 420 nm.

A coefficient of size variation of the dielectric grains obtained from Equation 1 may be 30% to 45%.

$$\text{Coefficient of size variation (\%)} = \{\text{Standard deviation } (\sigma) \text{ of size/average}\} \times 100 \quad \text{[Equation 1]}$$

(in Equation 1, the standard deviation (o) of size is a square root of an average of squares of deviation.)

The dielectric layer may further include an accessory ingredient, and the accessory ingredient may include dysprosium (Dy), terbium (Tb), manganese (Mn), vanadium (V), barium (Ba), silicon (Si), aluminum (Al), calcium (Ca), or combinations thereof.

Based on 100 parts by mole of the barium titanate-based main ingredient, dysprosium (Dy) may be included in an amount of 0.1 parts by mole to 1.0 parts by mole, terbium (Tb) may be included in an amount of 0.1 parts by mole to 1.0 parts by mole, manganese (Mn) may be included in an amount of 0.01 parts by mole to 0.5 parts by mole, vanadium (V) may be included in an amount of 0.01 parts by mole to 0.5 parts by mole, barium (Ba) may be included in an amount of 0.5 parts by mole to 3.0 parts by mole, silicon (Si) may be included in an amount of 0.5 parts by mole to 4.0 parts by mole, aluminum (Al) may be included in an amount of 0.1 parts by mole to 1.0 parts by mole, or calcium (Ca) may be included in an amount of 0.01 parts by mole to 1.0 parts by mole.

Another embodiment of the present disclosure provides a method of manufacturing a multilayer ceramic capacitor including: manufacturing dielectric powder by mixing barium titanate-based main ingredient powder including a barium (Ba) precursor and a titanium (Ti) precursor and a compound containing phosphorus (P); manufacturing a dielectric green sheet by using dielectric slurry including the dielectric powder, and forming a conductive paste layer on a surface of the dielectric green sheet; manufacturing a dielectric green sheet stacking structure by stacking the dielectric green sheet on which the conductive paste layer is formed; manufacturing a capacitor body including a dielectric layer and an internal electrode layer by sintering the dielectric green sheet stacking structure; and forming an external electrode on one side of the capacitor body, wherein the compound containing phosphorus (P) is mixed in an amount of 0.006 parts by mole to 0.23 parts by mole based on 100 parts by mole of the barium titanate-based main ingredient powder, and the dielectric layer includes the barium titanate-based main ingredient and the element of phosphorus (P).

The compound containing phosphorus (P) may include at least one selected from the group consisting of phosphorus pentoxide ($P_2O_5$), phosphoric acid ($H_3PO_4$), phosphoryl chloride ($POCl_3$), hydrocarbon compound containing phosphorus, and combinations thereof.

The hydrocarbon compound containing phosphorus may include a phosphate compound, a phosphite compound, a phosphonate compound, a phosphinate compound, or combinations thereof.

The manufacturing of dielectric powder may further include, after mixing the barium titanate-based main ingredient powder and the compound containing phosphorus (P), optionally drying and dry grinding the mixture obtained by the mixing, calcinating a pulverized material obtained by the dry grinding, optionally wet grinding a calcinated material obtained by the calcinating, and optionally drying and dry grinding a pulverized material obtained by the wet grinding.

The calcination may be performed at a temperature of 800° C. to 1000° C.

The dielectric slurry may further include accessory ingredient powder, and the accessory ingredient powder may include dysprosium oxide ($Dy_2O_3$), terbium oxide ($Tb_2O_3$), manganese oxide ($MnO_2$), vanadium oxide ($V_2O_5$), barium carbonate ($BaCO_3$), silicon dioxide ($SiO_2$), aluminum oxide ($Al_2O_3$), calcium carbonate ($CaCO_3$), or combinations thereof.

Based on 100 parts by mole of the barium titanate-based main ingredient powder, dysprosium oxide ($Dy_2O_3$) may be included in an amount of 0.1 parts by mole to 1.0 parts by mole, terbium oxide ($Tb_2O_3$) may be included in an amount of 0.1 parts by mole to 1.0 parts by mole, manganese oxide ($MnO_2$) may be included in an amount of 0.01 parts by mole to 0.5 parts by mole, vanadium oxide ($V_2O_5$) may be included in an amount of 0.01 parts by mole to 0.5 parts by mole, barium carbonate ($BaCO_3$) may be included in an amount of 0.5 parts by mole to 3.0 parts by mole, silicon dioxide ($SiO_2$) may be included in an amount of 0.5 parts by mole to 4.0 parts by mole, aluminum oxide ($Al_2O_3$) may be included in an amount of 0.1 parts by mole to 1.0 parts by mole, and calcium carbonate ($CaCO_3$) may be included in an amount of 0.01 parts by mole to 1.0 parts by mole.

The multilayer ceramic capacitor according to the embodiment has the dielectric layer with the uniform particle size, thereby having excellent reliability such as the high temperature and moisture resistance characteristic and the withstand voltage characteristic.

DETAILED DESCRIPTION OF THE EMBODIMENTS

Figure 1:
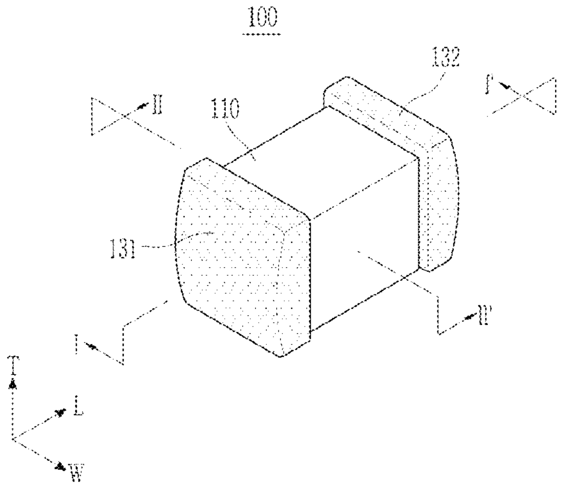
FIG. 1 shows a perspective view of a multilayer ceramic capacitor according to an embodiment.

The present disclosure will be described more fully hereinafter with reference to the accompanying drawings, in which embodiments of the disclosure are shown. The drawings and description are to be regarded as illustrative in nature and not restrictive, and like reference numerals designate like elements throughout the specification. Some constituent elements are exaggerated, omitted, or briefly illustrated in the added drawings, and sizes of the respective constituent elements do not reflect the actual sizes.

The accompanying drawings are provided only in order to allow embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof. Unless explicitly described to the contrary, the word "comprise" and variations such as "comprises" or "comprising" will be understood to imply the inclusion of stated elements but not the exclusion of any other elements.

The phrase "in a plan view" means viewing an object portion from the top, and the phrase "in a cross-sectional view" means viewing a cross-section of which the object portion is vertically cut from the side.

When it is described that a part is "connected (in contact with, coupled)" to another part, the part may be "directly connected" to the other element, may be "connected" to the other part through a third part, or may be connected to the other part physically or electrically, and they may be referred to by different titles depending on positions or functions, but they may be substantially integrated into one body.

A multilayer ceramic capacitor according to an embodiment will now be described with reference to FIG. 1 to FIG. 3.

Figure 2:
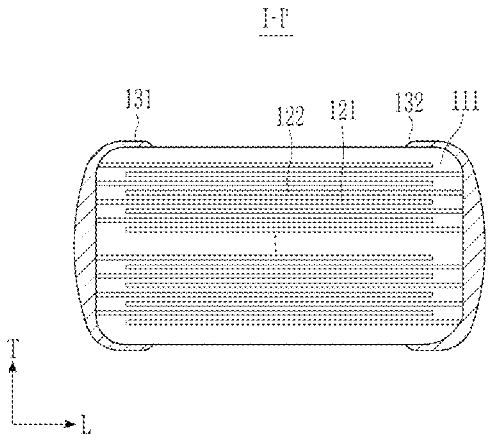
FIG. 2 shows a cross-sectional view of a multilayer ceramic capacitor with respect to a line I-I' of FIG. 1.
Figure 3:
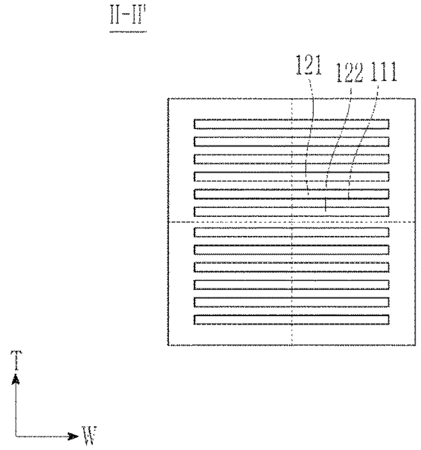
FIG. 3 shows a cross-sectional view of a multilayer ceramic capacitor with respect to a line II-II' of FIG. 1.

FIG. 1 shows a perspective view of a multilayer ceramic capacitor according to an embodiment, FIG. 2 shows a cross-sectional view of a multilayer ceramic capacitor with respect to a line I-I' of FIG. 1, and FIG. 3 shows a cross-sectional view of a multilayer ceramic capacitor with respect to a line II-II' of FIG. 1.

An L-axis, a W-axis, and a T-axis shown in FIG. 1 to FIG. 3 represent a length direction, a width direction, and a thickness direction of a capacitor body 110, respectively. Here, the thickness direction (T-axis direction) may be a direction perpendicular to a wide surface (main surface) of the constituent elements in a sheet shape, and may for example be used as a same concept as the multilayer direction in which the dielectric layer 111 is stacked. The length direction (L-axis direction) may be a direction that extends parallel to a broad surface (main surface) of the constituent elements in the sheet shape and may be a direction approximately perpendicular to the thickness direction (T-axis direction), for example, it may be the direction in which the first external electrode 131 and the second external electrode 132 are disposed on respective sides. The width direction (W-axis direction) may be a direction that extends parallel to the broad surface (main surface) of the constituent elements in the sheet shape and may be a direction that is approximately perpendicular to the thickness direction (T-axis direction) and the length direction (L-axis direction), and the length of the constituent elements in the sheet shape in the length direction (L-axis direction) may be greater than the length in the width direction (W-axis direction).

Referring to FIG. 1 to FIG. 3, the multilayer ceramic capacitor 100 according to an embodiment includes a capacitor body 110, and external electrodes 131 and 132 disposed outside the capacitor body 110. The external electrodes 131 and 132 may include a first external electrode 131 and a second external electrode 132 disposed at respective ends opposing in the length direction (L-axis direction) of the capacitor body 110.

As an example, the capacitor body 110 may have an approximate hexahedral shape.

For better understanding and ease of description of an embodiment, respective sides of the capacitor body 110 facing each other in the thickness direction (T-axis direction) will be defined to be a first side and a second side, respective sides connected to the first side and the second side and facing each other in the length direction (L-axis direction) will be defined to be a third side and a fourth side, and respective sides connected to the first and second sides, connected to the third and fourth sides, and facing each other in the width direction (W axis direction) will be defined to be a fifth side and a sixth side.

For example, the first side, which is a lower surface, may be the side facing a mounting direction. Additionally, the first to sixth sides may be flat, and the embodiment is not limited thereto. For example, the first to sixth sides may be curved surfaces of which central portions are convex, and edges that are boundaries of the respective sides may be round.

The shape and dimensions of the capacitor body 110 and the number of multilayers of the dielectric layer 111 are not limited to those shown in the drawing of the present embodiment.

The capacitor body 110 includes dielectric layers 111 and internal electrode layers 121 and 122. Specifically, the capacitor body 110 includes dielectric layers 111 and a first internal electrode 121 and a second internal electrode 122 alternately arranged in the thickness direction (T-axis direction) with the dielectric layer 111 interposed therebetween.

At this time, the boundary between the adjacent dielectric layers 111 of the capacitor body 110 may be integrated to the extent that it is difficult to check without using a scanning electron microscope (SEM).

The capacitor body 110 may have an active portion. The active portion is a region where the dielectric layers 111 and the internal electrode layers 121 and 122 are alternately arranged, and is a portion that contributes to forming capacity of the multilayer ceramic capacitor 100. Specifically, the active portion may be a region where the first internal electrode 121 and the second internal electrode 122 stacked in the thickness direction (T-axis direction) overlap.

Additionally, the capacitor body 110 may further include a cover portion and a side margin portion.

The cover portion may be a thickness-direction margin portion and may be disposed on the first and second sides of the active portion in the thickness direction (T-axis direction). This cover portion may be a single dielectric layer 111 or two or more dielectric layers 111 stacked on an upper side and a lower side of the active portion, respectively.

The side margin portion may be a side cover portion, and may be disposed on respective side ends of the active portion facing each other in the width direction (W-axis direction), that is, on the fifth and sixth sides. The side margin portion may be formed by applying a conductive paste layer in a predetermined region of the dielectric green sheet surface, stacking dielectric green sheets on which the conductive paste layer is not applied on respective lateral sides of the dielectric green sheet surface, and sintering the same when applying a conductive paste layer for the internal electrode layer on a dielectric green sheet surface, but is not limited to this forming method.

The cover portion and the side margin portion serve to prevent damages to the first internal electrode 121 and the second internal electrode 122 due to physical or chemical stresses.

The dielectric layer 111 includes a barium titanate-based main ingredient and an element of phosphorus (P).

The barium titanate-based main ingredient is a dielectric base material, has a high dielectric constant, and contributes to the formation of the dielectric constant of the multilayer ceramic capacitor 100.

The barium titanate-based main ingredient may include, for example, at least one selected from the group consisting of $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, and combinations thereof.

The element of phosphorus (P) may be derived from the compound containing phosphorus (P) added to the dielectric base material.

The element of phosphorus (P) may be included in an amount of 0.006 parts by mole to 0.23 parts by mole based on the barium titanate-based main ingredient of 100 parts by mole, and may be for example 0.01 parts by mole to 0.15 parts by mole. When the element of phosphorus (P) is included within the range in the dielectric layer 111, the abnormal grain growth of the dielectric grains may be suppressed by a difference of ion radii of the element of phosphorus (P), and thus it is possible to secure dielectric grains of a uniform size in the dielectric layer. Accordingly, the reliability such as the high temperature and moisture resistance characteristic and the withstand voltage characteristics of the multilayer ceramic capacitor may be improved.

A content of the element of phosphorus (P) in the dielectric layer 111 may be measured by an inductively coupled plasma (ICP) analysis. In detail, the content thereof in a dielectric layer sample of the multilayer ceramic capacitor may be measured in a quartz chamber by using a device of the AVIO500 (Perkin Elmer) of an inductively coupled plasma-optical emission spectrometry (ICP-OES), in a condition, for example, of 12 L/min of a plasma gas flow, 0.2 L/min of an auxiliary gas flow, 0.5 L/min of a nebulizer flow, 1400 W of plasma RF power, and a plasma mode axial.

The dielectric layer 111 may include a plurality of dielectric grains. In this instance, the dielectric grains may include the aforementioned barium titanate-based main ingredient and the element of phosphorus (P).

A D10 diameter of the dielectric grains may be 100 nm to 140 nm, for example, 110 nm to 130 nm. Additionally, a D50 diameter of the dielectric grains may be 150 nm to 250 nm, for example, 180 nm to 220 nm, or for example, 190 nm to 210 nm. Additionally, a D90 diameter of the dielectric grain may be 300 nm to 420 nm, for example 310 nm to 350 nm, or for example, 320 nm to 340 nm. When the sizes of the respective dielectric grains, that is, D10, D50, and D90, are within the range, high reliability and excellent withstand voltage resistance characteristics may be achieved by securing the dielectric layer with uniform dielectric grains.

The size of the dielectric grains may be measured by the following method.

First, the multilayer ceramic capacitor 100 is put in an epoxy mixed solution and is cured, a side (WT side) of the capacitor body 110 in the W-axis and T-axis directions is polished up to a ½ point in the L-axis direction, is fixed, and is maintained at a vacuum atmosphere in a chamber, and a cross-section sample may be obtained to observe the active portion where the dielectric layer 111 crosses the internal electrode layers 121 and 122. Next, the active portion of the cross-section sample may be ion milled and may be measured using a scanning electron microscope (SEM). For example, the scanning electron microscope uses the Verios G4 product from Thermofisher Scientific, the measurement condition is 10 kV, 0.2 nA, the analysis magnification may be 100 times, and a measurement may be performed to generate the dielectric layer 111 of at least one layer, at least three layers, at least five layers, and at least ten layers. Regarding the sizes of the dielectric grains, a size distribution cumulative curve is made by measuring the maximum long axis of at least 100 dielectric grains in the scanning electron microscope image of the cross-section sample, and D10, D50, and D90 diameters are respectively calculated. In this instance, the D10, D50, and D90 diameters represent the sizes at the points of 10%, 50%, and 90%, respectively, in the size distribution cumulative curve.

Additionally, a coefficient of size variation of the dielectric grains may be 30% to 45%, for example, 30% to 43%. When the coefficient of size variation of the dielectric grains is within the range, a distribution characteristic of the size of the dielectric grains is excellent so the multilayer ceramic capacitor with excellent reliability such as high temperature and moisture resistance characteristic and the withstand voltage characteristic may be secured.

The coefficient of size variation of the dielectric grains may be obtained by Equation 1.

$$\text{Coefficient of size variation (\%)} = \{\text{Standard deviation } (\sigma) \text{ of size/average}\} \times 100 \qquad \text{[Equation 1]}$$

In Equation 1, the standard deviation (σ) of size represents squaring the deviation, adding it up, dividing it by the number of measurements, and finding its square root, that is, the square root of the average of the squares of the deviation as in Equation 2.

$$\sigma = \sqrt{\frac{1}{n}\sum_{i=1}^{n}(x_i - \overline{x})^2} \qquad \text{[Equation 2]}$$

Figure 4:
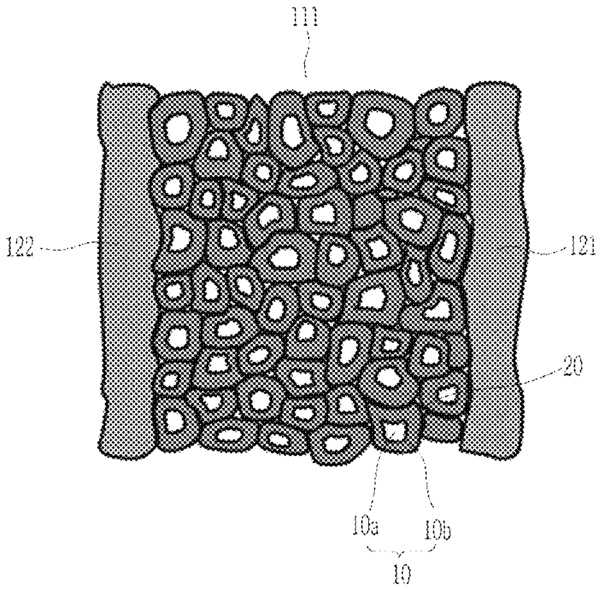
FIG. 4 shows a schematic diagram of dielectric grains of a dielectric layer according to an embodiment.

FIG. 4 shows a schematic diagram of dielectric grains of a dielectric layer according to an embodiment.

Referring to FIG. 4, the dielectric layer 111 may include a dielectric grain 10 and a grain boundary 20 between the adjacent dielectric grain 10. At least one of the dielectric grains 10 may have a core-shell structure including a core 10*a* and a shell 10*b* surrounding the core 10*a*. The dielectric layer 111 including the element of phosphorus (P) in an amount of 0.006 parts by mole to 0.23 parts by mole with respect to 100 parts by mole of the barium titanate-based main ingredient may have dielectric grains 10 with a uniform size as shown in FIG. 4.

The dielectric layer 111 may further include at least one of accessory ingredients selected from the group consisting of dysprosium (Dy), terbium (Tb), manganese (Mn), vanadium (V), barium (Ba), silicon (Si), aluminum (Al), calcium (Ca), and combinations thereof.

The accessory ingredients may be derived from a metal oxide, which is added as an accessory ingredient to the dielectric base material.

Dysprosium (Dy) may be included in an amount of 0.1 parts by mole to 1.0 parts by mole of based on 100 parts by mole of the barium titanate-based main ingredient. Terbium (Tb) may be included in an amount of 0.1 parts by mole to 1.0 parts by mole based on 100 parts by mole of the barium titanate-based main ingredient. Manganese (Mn) may be included in an amount of 0.01 parts by mole to 0.5 parts by mole based on 100 parts by mole of the barium titanate-based main ingredient. Vanadium (V) may be included in an amount of 0.01 parts by mole to 0.5 parts by mole based on 100 parts by mole of the barium titanate-based main ingredient. Barium (Ba) may be included in an amount of 0.5 parts by mole to 3.0 parts by mole based on 100 parts by mole of the barium titanate-based main ingredient. Silicon (Si) may be included in an amount of 0.5 parts by mole to 4.0 parts by mole based on 100 parts by mole of the barium titanate-based main ingredient. Aluminum (Al) may be included in an amount of 0.1 parts by mole to 1.0 parts by mole based on 100 parts by mole of the barium titanate-based main ingredient. Calcium (Ca) may be included in an amount of 0.01 parts by mole to 1.0 parts by mole based on 100 parts by mole of the barium titanate-based main ingredient. When the accessory ingredients are included within the content range, the multilayer ceramic capacitor with high capacity, high reliability, and excellent withstand voltage characteristics may be secured.

An average thickness (average length in the T-axis direction) of the dielectric layer 111 may be 2.0 μm to 8.0 μm, for example, 2.4 μm to 7.8 μm. When the average thickness of the dielectric layer 111 is within the range, the reliability of the multilayer ceramic capacitor is excellent.

The average thickness of the dielectric layer 111 may be measured by putting the multilayer ceramic capacitor 100 in the epoxy mixed solution, curing it, polishing it, ion milling it, and analyzing it with a scanning electron microscope (SEM). For example, the scanning electron microscope uses the Verios G4 product from Thermofisher Scientific, the measurement condition is 10 kV, 0.2 nA, the analysis magnification may be 100 times, and a measurement may be performed to generate the dielectric layer 111 of at least one layer, at least three layers, at least five layers, and at least ten layers. In the scanning electron microscope (SEM) image, when the center point of the length direction (L-axis direction) or the width direction (W-axis direction) of dielectric layer 111 is used as a reference point, it may be an arithmetic mean value of the thicknesses of the dielectric layer 111 at ten points that are distant from the reference point at predetermined intervals. A space of ten points may be adjusted according to a scale of the scanning electron microscope (SEM) image, for example, the space may be 1 μm to 100 μm, 1 μm to 50 μm, or 1 μm to 10 μm. At this time, the ten points must be disposed in the dielectric layer 111, and when the ten points are not disposed in the dielectric layer 111, the position of the reference point may be changed or the space among the ten points may be adjusted.

The first internal electrode 121 and the second internal electrode 122 have different polarities, and are arranged alternately to face each other in the T-axis direction with the dielectric layer 111 therebetween, and one ends may be respectively exposed through the third and fourth sides of the capacitor body 110.

The first internal electrode 121 and the second internal electrode 122 may be electrically insulated from each other by the dielectric layer 111 disposed in the middle.

The ends of the first internal electrode 121 and the second internal electrode 122, which are alternately exposed through the third and fourth sides of the capacitor body 110, may be electrically connected to the first external electrode 131 and the second external electrode 132, respectively.

The first internal electrode 121 and the second internal electrode 122 include a conductive metal, for example, metals such as Ni, Cu, Ag, Pd, and Au, or alloys thereof such as an alloy of Ag—Pd.

The first internal electrode 121 and the second internal electrode 122 may include dielectric particles with a same composition as the ceramic material included in the dielectric layer 111.

The first internal electrode 121 and the second internal electrode 122 may be made by using a conductive paste including a conductive metal. A method for printing the conductive paste may use a screen printing method or a gravure printing method.

The average thickness of the first internal electrode 121 and the second internal electrode 122 may be 0.1 μm to 2 μm. The average thickness of the first internal electrode 121 and the second internal electrode 122 may be measured by the scanning electron microscope (SEM) analysis. Here, the scanning electron microscope (SEM) analysis corresponds to the method for measuring the average thickness of the above-noted dielectric layers 111 so it will not be described.

The capacitor body 110 may be formed by sintering the multilayer body in which the dielectric layers 111 and the internal electrode layers 121 and 122 are stacked.

The first external electrode 131 and the second external electrode 132 provide voltages with different polarities, and may be electrically connected to exposed portions of the first internal electrode 121 and the second internal electrode 122.

According to the above-described configuration, when a predetermined voltage is applied to the first external electrode 131 and the second external electrode 132, charges are stored between the first internal electrode 121 and the second internal electrode 122 opposing each other. In this instance, capacitance of the multilayer ceramic capacitor 100 is proportional to an area in which the first internal electrode 121 overlaps the second internal electrode 122 in the T-axis direction in the active portion.

The first external electrode 131 and the second external electrode 132 may respectively include first and second access portions arranged on the third and fourth sides of the capacitor body 110 and connected to the first internal electrode 121 and the second internal electrode 122, and first and second band portions arranged at corners where the third and fourth sides of the capacitor body 110 meet the first and second sides or the fifth and sixth sides.

The first and second band portions may respectively extend to some of the first and second sides or the fifth and sixth sides of the capacitor body 110 from the first and second access portions. The first and second band portions may increase fixing intensity of the first external electrode 131 and the second external electrode 132.

The first external electrode 131 and the second external electrode 132 may include a sintered metal film contacting the capacitor body 110, a conductive resin layer arranged to cover the sintered metal film, and a plated layer for covering the conductive resin layer.

The sintered metal film may include a conductive metal and glass.

The conductive metal may include at least one selected from the group consisting of copper (Cu), nickel (Ni), silver (Ag), palladium (Pd), gold (Au), platinum (Pt), tin (Sn), tungsten (W), titanium (Ti), lead (Pb), alloys thereof, and combinations thereof, and for example, copper (Cu) may include an alloy of copper (Cu). When the conductive metal includes copper, metals other than copper (Cu) may be included as equal to or less than 5 parts by mole for 100 parts by mole of copper (Cu).

The glass may include a composition of mixed oxides, for example, at least one selected from the group consisting of a silicon oxide, a boron oxide, an aluminum oxide, a transition metal oxide, an alkali metal oxide, and an alkaline earth metal oxide. The transition metal may include at least one selected from zinc (Zn), titanium (Ti), copper (Cu), vanadium (V), manganese (Mn), iron (Fe), and nickel (Ni). The alkali metal may include at least one selected from the group consisting of lithium (Li), sodium (Na), and potassium (K), and the alkaline earth metal may be one or more selected from magnesium (Mg), calcium (Ca), strontium (Sr), and barium (Ba).

Optionally, the conductive resin layer may be formed on the sintered metal film, and for example, it may completely cover the sintered metal film. Meanwhile, the first external electrode 131 and the second external electrode 132 may not include the sintered metal film, and in this case, the conductive resin layer may directly contact the capacitor body 110.

The conductive resin layer may extend to the first and second sides or the fifth and sixth sides of the capacitor body 110, and a length of the region (i.e., band portion) in which the conductive resin layer extends to the first and second sides or the fifth and sixth sides of the capacitor body 110 may be greater than a length of the region (i.e., band portion) in which the sintered metal film is arranged to extend to the first and second sides or the fifth and sixth sides of the capacitor body 110. In other words, the conductive resin layer is formed on the sintered metal film and may completely cover the sintered metal film.

The conductive resin layer may include a resin and a conductive metal.

The resin included in the conductive resin layer is not particularly limited as long as it has adhesion and impact absorption properties and may be mixed with conductive metal powder to make a paste, and for example, it may include phenol resin, acryl resin, silicone resin, epoxy resin, or polyimide resin.

The conductive metal included in the conductive resin layer may serve to be electrically connected to the first internal electrode 121 and the second internal electrode 122 or the sintered metal film.

The conductive metal included in the conductive resin layer may have a spherical shape, a flake shape, or combinations thereof. In other words, the conductive metal may be formed in a flake form, in a spherical form, or may be a mixture of the flake form and the spherical form.

Here, the sphere form may include a shape that is not a perfect sphere and, for example, it may include a shape in which the length ratio (long axis/short axis) of the long axis and the short axis is 1.45 or less. Flake-type powder refers to powder that has a flat and elongated shape, and is not particularly limited, but for example, the length ratio (long axis/short axis) of the long axis and the short axis may be 1.95 or more.

The first external electrode 131 and the second external electrode 132 may further include a plated layer disposed outside the conductive resin layer.

The plated layer may include at least one selected from the group consisting of nickel (Ni), copper (Cu), tin (Sn), palladium (Pd), platinum (Pt), gold (Au), silver (Ag), tungsten (W), titanium (Ti), and lead (Pb), or alloys thereof. For example, the plated layer may include nickel (Ni) plated layer or a tin (Sn) plated layer, may have a form in which the nickel (Ni) plated layer and the tin (Sn) plated layer are sequentially stacked, and may have a form in which the tin (Sn) plated layer, the nickel (Ni) plated layer, and the tin (Sn) plated layer are sequentially stacked. Additionally, the plated layers may include nickel (Ni) plated layers and/or tin (Sn) plated layers.

The plated layers may improve the mountability of the multilayer capacitor 100 on the substrate, structural reliability, external durability, heat resistance, and equivalent series resistance (ESR).

A method of manufacturing the multilayer ceramic capacitor 100 according to an embodiment will now be described with reference to FIG. 5 and FIG. 6.

Figure 5:
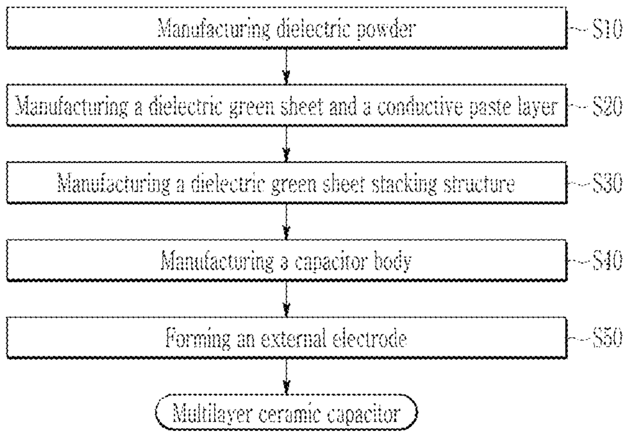
FIG. 5 shows a processing flowchart of a method of manufacturing a multilayer ceramic capacitor according to an embodiment.
Figure 6:
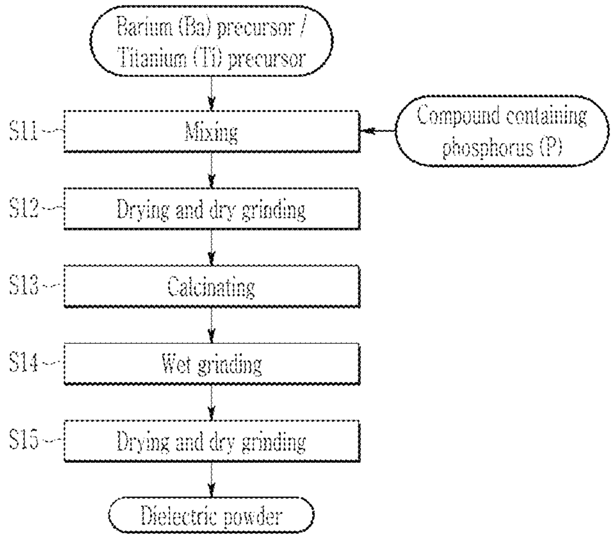
FIG. 6 shows a processing flowchart of a process for manufacturing dielectric powder in a method of manufacturing a multilayer ceramic capacitor according to an embodiment.

FIG. 5 shows a processing flowchart of a method of manufacturing a multilayer ceramic capacitor according to an embodiment, and FIG. 6 shows a processing flowchart of a process for manufacturing dielectric powder in a method of manufacturing a multilayer ceramic capacitor according to an embodiment.

Referring to FIG. 5, the method includes: manufacturing dielectric powder by mixing barium titanate-based main ingredient powder including a barium (Ba) precursor and a titanium (Ti) precursor and a compound containing phosphorus (P) (S10); manufacturing a dielectric green sheet by using dielectric slurry including the dielectric powder, and forming a conductive paste layer of the dielectric green sheet surface (S20); manufacturing a dielectric green sheet stacking structure by stacking the dielectric green sheet on which the conductive paste layer is formed (S30); manufacturing a capacitor body including a dielectric layer and an internal electrode layer by sintering the dielectric green sheet stacking structure (S40); and forming an external electrode on one side of the capacitor body (S50).

The process for manufacturing dielectric powder (S10) will now be described.

The dielectric powder may be manufactured by mixing the barium titanate-based main ingredient powder and the compound containing phosphorus (P). The barium titanate-based main ingredient powder may include a barium (Ba) precursor and a titanium (Ti) precursor.

The barium (Ba) precursor may include at least one selected from the group consisting of $BaO_2$, BaTiOs, $BaCO_3$, BaO and combinations thereof.

The titanium (Ti) precursor may include a titanium oxide, salt thereof, or titanium alkoxide. The titanium (Ti) precursor may include, for example, at least one selected from the group consisting of titanium dioxide, titanium diisopropoxide diacetyl acetonate (TPA), titanium alkoxide, and combinations thereof.

The barium (Ba) precursor may be included in an amount of 0.990 mole to 1.000 mole based on 1 mole of the titanium (Ti) precursor.

The compound containing phosphorus (P) may be mixed in an amount of 0.006 parts by mole to 0.23 parts by mole based on 100 parts by mole of the barium titanate-based main ingredient powder, and for example, 0.01 parts by mole to 0.15 parts by mole thereof may be mixed. When the compound containing phosphorus (P) is mixed within the content range in the case of manufacturing the dielectric powder, uniform barium titanate-based powder may be obtained so the dielectric grains with a uniform size may be obtained in the dielectric layer. Hence, the multilayer ceramic capacitor with excellent reliability such as the high temperature and moisture resistance characteristic and the withstand voltage characteristic may be obtained.

The compound containing phosphorus (P) may, for example, include at least one selected from the group consisting of phosphorus pentoxide ($P_2O_5$), phosphoric acid ($H_3PO_4$), phosphoryl chloride ($POCl_3$), a hydrocarbon compound containing phosphorus (P), and combinations thereof, but it is not limited thereto.

The hydrocarbon compound containing phosphorus may include at least one selected from the group consisting of a phosphate compound, a phosphite compound, a phosphonate compound, a phosphinate compound, and combinations thereof.

Referring to FIG. 6, the manufacturing of dielectric powder (S10) may include: mixing barium titanate-based main ingredient powder including a barium (Ba) precursor and a titanium (Ti) precursor, and the compound containing phosphorus (P) (S11); optionally drying and dry grinding a mixture obtained by the mixing (S12); calcinating a pulverized material obtained by the dry grinding (S13); optionally wet grinding a calcinated material obtained by the calcination (S14); and optionally drying and dry grinding the pulverized material obtained by the wet grinding (S15).

The mixing (S11) may include a wet mixing. In detail, the wet mixing may be performed using a disperser such as a beads mill or a ball mill, or performing a high-pressure dispersion treatment to disperse the mixture in a wet manner together with a solvent. For example, in the case of dispersing using the beads mill, the beads having a diameter of about 0.03 mm to about 0.1 mm may be used for a dispersion process in about 5 to about 30 passes at a peripheral speed of about 5 m/s to about 15 m/s.

The solvent used for wet-mixing may include, for example, an aqueous solvent such as ion-exchanged water, pure water, ultrapure water, or distilled water, or an alcohol-based solvent, or an amine-based solvent such as ammonia, or organic amine may be used together with water.

Optionally, a dispersant may be further added in the mixing (S11), and may include, for example, a polyvinylbutyl-based dispersant, a polyvinylacetal-based dispersant, a polycarbonic acid-based dispersant, a maleic acid-based dispersant, a polyethylene glycol-based dispersant, an allylethercopolymer-based dispersant, and the like.

Optionally, the mixture obtained by the mixing may be dried and dry ground (S12).

A process for calcinating the pulverized material obtained by the dry grinding is performed (S13).

The calcination may be performed at the temperature of 800° C. to 1000° C., for example, 840° C. to 900° C. The calcination may be performed for 1 hour to 8 hours, for example, 2 hours to 6 hours. The calcination may be performed at a vacuous atmosphere or a normal pressure atmosphere, for example, at the atmosphere of 10,000 Pa to 1,000,000 Pa. The vacuous atmosphere may be, for example, a vacuous atmosphere of less than or equal to about 20,000 Pa, or less than or equal to about 100 Pa. When the calcination is performed in the condition including the temperature range, uniform dielectric powder may be obtained without non-reaction and dispersion problems.

Optionally, the calcinated material obtained by the calcination is wet ground (S14), and the pulverized material obtained by the wet grinding is dried and dry ground (S15) to obtain dielectric powder.

A dielectric green sheet and a conductive paste layer are formed by using dielectric slurry including the obtained dielectric powder (S20).

The dielectric slurry may further include accessory ingredient powder. The accessory ingredient powder may be used in a sol type dispersed in an organic solvent.

The accessory ingredient powder may include at least one selected from the group consisting of dysprosium oxide ($Dy_2O_3$), terbium oxide ($Tb_2O_3$), manganese oxide ($MnO_2$), vanadium oxide ($V_2O_5$), barium carbonate ($BaCO_3$), silicon dioxide ($SiO_2$), an aluminum oxide ($Al_2O_3$), calcium carbonate ($CaCO_3$), and combinations thereof. The accessory ingredient powder may be used in a sol type dispersed in an organic solvent.

Dysprosium oxide ($Dy_2O_3$) may be included in an amount of 0.1 parts by mole to 1.0 parts by mole based on 100 parts by mole of the barium titanate-based main ingredient powder. Terbium oxide ($Tb_2O_3$) may be included in an amount of 0.1 parts by mole to 1.0 parts by mole based on 100 parts by mole of the barium titanate-based main ingredient powder. Manganese oxide $MnO_2$ may be included in an amount of 0.01 parts by mole to 0.5 parts by mole base on 100 parts by mole of the barium titanate-based main ingredient powder. Vanadium oxide ($V_2O_5$) may be included in an amount of 0.01 parts by mole to 0.5 parts by mole based on 100 parts by mole of the barium titanate-based main ingredient powder. Barium carbonate ($BaCO_3$) may be included in an amount of 0.5 parts by mole to 3.0 parts by mole based on 100 parts by mole of the barium titanate-based main ingredient powder. Silicon dioxide ($SiO_2$) may be included in an amount of 0.5 parts by mole to 4.0 parts by mole based on 100 parts by mole of the barium titanate-based main ingredient powder. Aluminum oxide ($Al_2O_3$) may be included in an amount of 0.1 parts by mole to 1.0 parts by mole based on 100 parts by mole of the barium titanate-based main ingredient powder. Calcium carbonate ($CaCO_3$) may be included in an amount of 0.01 parts by mole to 1.0 parts by mole based on 100 parts by mole of the barium titanate-based main ingredient powder. When the accessory ingredients are included within the content range, the multilayer ceramic capacitor with high capacity, high reliability, and excellent withstand voltage characteristics may be secured.

Also, the dielectric slurry may be manufactured by additionally mixing additives such as a dispersant, a binder, a plasticizer, a lubricant, or an antistatic agent and a solvent.

The dispersant may include, for example, at least one selected from the group consisting of a phosphoric acid ester-based dispersant, a polycarboxylic acid-based dispersant, and combinations thereof. The dispersant may be mixed in an amount of 0.1 parts by weight to 5 parts by weight based on 100 parts by weight of the dielectric powder, for example, in an amount of 0.3 parts by weight to 3 parts by weight. When the dispersant is mixed within the content range, dispersion of the dielectric slurry may be excellent, and an amount of impurities included in the manufactured dielectric layer may be reduced.

The binder may be, for example, an acryl resin, a polyvinyl butyral resin, a polyvinyl acetal resin, and an ethyl cellulose resin. The binder may be added in an amount of 0.1 parts by weight to 50 parts by weight based on 100 parts by weight of the dielectric powder, for example, in an amount of 3 parts by weight to 30 parts by weight. When the binder is mixed within the content range, dispersion of the dielectric slurry may be excellent, and the amount of the impurities included in the manufactured dielectric layer may be reduced.

The plasticizer may include, for example, at least one selected from the group consisting of a phthalate-based compound such as dioctyl phthalate, benzyl butyl phthalate, dibutyl phthalate, dihexyl phthalate, di(2-ethylhexyl) phthalate, or di(2-ethyl butyl) phthalate; an adipate-based compound such as dihexyl adipate, or di(2-ethylhexyl) adipate; a glycol-based compound such as ethylene glycol, diethylene glycol, or triethylene glycol; and a glycol ester-based compound such as triethylene glycol dibutyrate, triethylene glycol di(2-ethyl dibutyrate), or triethylene glycol di(2-ethylhexanoate). The plasticizer may be added in an amount of 0.1 parts by weight to 20 parts by weight based on 100 parts by weight of the dielectric powder, for example, in an amount of 1 part by weight to 10 parts by weight. When the plasticizer is mixed within the content range, the dispersibility of the dielectric slurry is excellent and the amount of impurities contained in the manufactured dielectric layer may be reduced.

The solvent may include an aqueous solvent such as water; alcohol-based solvents such as ethanol, methanol, benzyl alcohol, and methoxyethanol; glycol-based solvents such as ethylene glycol and diethylene glycol; ketone-based solvents such as acetone, methyl ethyl ketone, methyl isobutyl ketone, and cyclohexanone; ester solvents such as butyl acetate, ethyl acetate, carbitol acetate, and butylcarbitol acetate; ether-based solvents such as methyl cellosolve, ethyl cellosolve, butyl ether, and tetrahydrofuran; and an aromatic solvent such as benzene, toluene, or xylene. The solvent may include an alcohol-based solvent or an aromatic-based solvent, considering the solubility and dispersibility of various additives included in the dielectric slurry. The solvent may be mixed in an amount of 50 parts by weight to 1000 parts by weight based on 100 parts by weight of the dielectric powder, for example, in an amount of 100 parts by weight to 500 parts by weight. When the solvent is mixed within the content range, the dielectric slurry components may be sufficiently mixed, and a subsequent removal of the solvent is easy.

Mixture of the dielectric powder and the accessory ingredient powder may be done using a wet ball mill or agitated mill. When using zirconia balls in the wet ball mill, the zirconia balls with a diameter of 0.1 mm to 10 mm may be used for a wet mixing for 8 hours to 48 hours, or 10 hours or 24 hours.

The manufactured dielectric slurry is formed into a dielectric layer when it is baked.

A dielectric green sheet using dielectric slurry is manufactured and a conductive paste layer is formed on the surface of the dielectric green sheet (S20). Methods for molding the manufactured dielectric slurry into a sheet shape include tape molding methods such as a doctor blade method and a calendar roll method, for example, a head discharge type on-roll forming coater may be used and the dielectric green sheet may then be obtained by drying the molded body.

To form a conductive paste layer that becomes an internal electrode layer after sintering, the conductive paste may be manufactured by mixing the conductive powder made of conductive metal or its alloy, the binder, and the solvent. Additionally, barium titanate powder may be mixed together as a co-material if necessary. the co-materials may suppress sintering of conductive powder during the sintering process. The conductive paste is applied in a predetermined pattern to the dielectric green sheet surface using various printing methods such as a screen printing or transfer methods to form the conductive paste layer.

The dielectric green sheet stacking structure is manufactured by stacking the dielectric green sheet on which an internal electrode pattern is formed on multiple layers and pressing the same in the stacked direction (S30). At this time, the dielectric green sheet and the internal electrode pattern may be stacked so that the dielectric green sheet is disposed on upper and lower surfaces of the dielectric green sheet stacking structure in the stacked direction.

It may an option to cut the manufactured dielectric green sheet stacking structure into predetermined dimensions by dicing, etc.

Additionally, the dielectric green sheet stacking structure may be solidified and dried to remove the plasticizer, etc., as needed, and it may then be barrel polished using a horizontal centrifugal barrel machine, etc. Regarding the barrel polishing, the dielectric green sheet stacking structure may be put into a barrel container along with media and polishing liquid, and unnecessary parts such as burrs generated during cutting may be polished by applying rotation motion or vibration to the barrel container. Additionally, after the barrel polishing, the dielectric green sheet stacking structure may be washed with a cleaning solution such as water and may be dried.

The capacitor body is manufactured by removing the binder from the dielectric green sheet stacking structure and sintering it (S40).

The condition for removing the binder may be appropriately adjusted depending on the components of the dielectric layer and the internal electrode layer. For example, a temperature during the binder removal process may be increased at a rate of 5° C./hour to 300° C./hour, a support temperature may be 180° C. to 400° C., and a temperature maintenance time may be 0.5 hour to 24 hours. The atmosphere during the binder removal process may be air or a reducing atmosphere.

The conditions of the sintering process may be appropriately adjusted depending on the main ingredient composition of the dielectric layer or the main ingredient composition of the internal electrode. For example, the sintering may be performed at the temperature of 1100° C. to 1400° C., for example, 1200° C. to 1350° C. Also, the sintering may be performed for 0.5 hours to 8 hours, for example, 1 hour to 3 hours. Also, the sintering may be performed in the reducing atmosphere, for example, an atmosphere humidifying mixed gas of nitrogen and hydrogen. When the internal electrode includes nickel (Ni) or an alloy of nickel (Ni), an oxygen partial pressure in the sintering atmosphere may be $1.0\times10^{-14}$ MPa to $1.0\times10^{-10}$ MPa.

An annealing may be performed as needed after the sintering. The annealing re-oxidizes the dielectric layer, and may be performed while the sintering is performed in the reducing atmosphere. The conditions of the annealing process may also be appropriately adjusted depending on the components of the dielectric layer. For example, the temperature during the annealing may be 950° C. to 1150° C., the duration of the annealing may be 0 hours to 20 hours, and the temperature may be increased at a rate of 50° C./hour to 500° C./hour. The annealing atmosphere may be a humidified nitrogen gas ($N_2$) atmosphere, and the oxygen partial pressure may be $1.0\times10^{-9}$ MPa to $1.0\times10^{-5}$ MPa.

Regarding the binder removal process, the sintering process, or the annealing process, a wetter, for example, may be used to humidify nitrogen gas or mixed gas, etc. and in this case, the water temperature may be 5° C. to 75° C. The binder removal, the sintering, and the annealing may be performed continuously or independently.

Optionally, surface processes such as sandblasting, laser irradiation, and barrel polishing may be performed on the third and fourth sides of the manufactured capacitor body 110. By performing this surface process, ends of the first internal electrode and the second internal electrode may be exposed on the outermost surfaces of the third and fourth sides so an electrical bonding between the first external electrode and second external electrode and the first internal electrode and the second internal electrode becomes better, and alloys may be easily formed.

An external electrode is formed on one side of the manufactured capacitor body 110 (S50).

For example, a paste for forming a sintered metal film may be applied to an external electrode and may be sintered to form a sintered metal film.

The paste for forming a sintered metal film may include a conductive metal and glass. The descriptions of the conductive metal and the glass are the same as described above, and thus repeated descriptions will be omitted. Additionally, the paste for forming a sintered metal film may optionally include a binder, a solvent, a dispersant, a plasticizer, oxide powder, etc. The binder may include, for example, ethylcellulose, acryl, butyral, etc., and the solvent may include an organic solvent or an aqueous solvent such as terpineol, butylcarbitol, alcohol, methyl ethyl ketone, acetone, and toluene.

Methods for applying the paste for forming a sintered metal film to the outer surface of the capacitor body 110 include various printing methods such as a dip method and a screen printing, an applying method using a dispenser, etc., and a spraying method using a spray. The paste for forming a sintered metal film is applied to at least the third and fourth sides of the capacitor body 110, and optionally also to some of the first, second, fifth, or sixth sides where the band portions of the first external electrode and the second external electrode are formed.

The capacitor body 110 coated with the paste for forming a sintered metal film is dried, and is sintered at the temperature of 700° C. to 1000° C. for 0.1 to 3 hours to form a sintered metal film.

Optionally, a conductive resin layer may be formed by applying a paste for forming a conductive resin layer to the outer surface of the obtained capacitor body 110 and then curing it.

The paste for forming a conductive resin layer may include resin, and optionally a conductive metal or a non-conductive filler. The description of the conductive metal and the resin is the same as described above, so repeated descriptions will be omitted. Additionally, the paste for forming a conductive resin layer may optionally include a binder, a solvent, a dispersant, a plasticizer, oxide powder, etc. The binder may use, for example, ethylcellulose, acryl, butyral, etc., and the solvent may use an organic solvent or an aqueous solvent such as terpineol, butylcarbitol, alcohol, methyl ethyl ketone, acetone, and toluene.

As an example, the method for forming a conductive resin layer is to form a conductive resin layer by dipping the capacitor body 110 into a paste for forming the conductive resin layer and then curing it, or by printing the paste for forming a conductive resin layer to the surface of the capacitor body 110 using a screen printing method or a gravure printing method, or by applying the paste for forming a conductive resin layer to the surface of the capacitor body 110 and then curing it.

A plated layer is formed on an outside of the conductive resin layer.

As an example, the plated layer may be formed by a plating method, or may be formed by a sputtering or an electric deposition.

The above-described implementation will be described in detail through the following embodiment. However, the following embodiments are for illustrative purposes only and do not limit the scope.

(Manufacturing a Multilayer Ceramic Capacitor)

Examples 1 to 7 and Comparative Examples 1 to 6

Barium titanate main ingredient powder was prepared by mixing $BaCO_3$ powder and $TiO_2$ powder (0.995 mole of $BaCO_3$ compared to 1 mole of $TiO_2$), and the barium titanate main ingredient powder and the phosphorus pentoxide $P_2O_5$ were mixed together. At this time, phosphorus pentoxide $P_2O_5$ was mixed with the content shown in Table 1 based on 100 parts by mole of the barium titanate main ingredient powder. The same was wet mixed with water using a beads mill. The mixture obtained by mixing was dried and the cohesive mixture was dry ground. The pulverized material obtained by dry grinding was calcinated at 950° C. for 3 hours under a normal pressure. The calcinated material obtained by calcinating was wet ground, the obtained pulverized material was dried, and dry ground to make dielectric powder.

The manufactured dielectric powder and the accessory ingredient powder including dysprosium oxide ($Dy_2O_3$), terbium oxide ($Tb_2O_3$), manganese oxide ($MnO_2$), vanadium oxide ($V_2O_5$), a barium carbonate ($BaCO_3$), silicon dioxide ($SiO_2$), aluminum oxide ($Al_2O_3$), and calcium carbonate ($CaCO_3$) were mixed with the composition shown in Table 1 to manufacture the dielectric slurry. At this time, each accessory ingredient powder was mixed with a content based on 100 parts by mole of the barium titanate main ingredient powder. At this time, ethanol/toluene, a wetting dispersant, and a polyvinyl butyral (PVB) resin as a binder are added together by using a zirconium ball ($ZrO_2$ ball) as a dispersion medium, and a mechanical milling was performed thereon to generate the mixing.

The dielectric green sheet was manufactured from the manufactured dielectric slurry using a head discharge type on-roll forming coater.

A conductive paste layer including nickel (Ni) is printed on the surface of the dielectric green sheet, and the dielectric green sheet (horizontal×vertical×height=3.2 mm×2.5 mm×2.5 mm) on which the conductive paste layer is formed is stacked and compressed to manufacture a dielectric green sheet stacking structure.

The dielectric green sheet stacking structure underwent a plasticization process in a nitrogen atmosphere at 400° C. or less and was baked under the conditions with the sintering temperature of 1300° C. or less and a hydrogen concentration of 1.0% $H_2$ or less.

A multilayer ceramic capacitor was manufactured through a process such as plating an external electrode.

TABLE 1

| | Barium titanate main ingredient powder | $P_2O_5$ (parts by mole*) | $Dy_2O_3$ (parts by mole*) | $Tb_2O_3$ (parts by mole*) | $MnO_2$ (parts by mole*) | $V_2O_5$(parts by mole*) | $BaCO_3$(parts by mole*) | $SiO_2$(parts by mole*) | $Al_2O_3$ (parts by mole*) | $CaCO_3$ (parts by mole*) |
|---|---|---|---|---|---|---|---|---|---|---|
| Example 1 | 100 | 0.010 | 1 | 1 | 0.2 | 0.15 | 1.5 | 4 | 0.6 | 0.8 |
| Example 2 | 100 | 0.040 | 1 | 1 | 0.2 | 0.15 | 1.5 | 4 | 0.6 | 0.8 |
| Example 3 | 100 | 0.070 | 1 | 1 | 0.2 | 0.15 | 1.5 | 4 | 0.6 | 0.8 |
| Example 4 | 100 | 0.100 | 1 | 1 | 0.2 | 0.15 | 1.5 | 4 | 0.6 | 0.8 |
| Example 5 | 100 | 0.140 | 1 | 1 | 0.2 | 0.15 | 1.5 | 4 | 0.6 | 0.8 |
| Example 6 | 100 | 0.170 | 1 | 1 | 0.2 | 0.15 | 1.5 | 4 | 0.6 | 0.8 |
| Example 7 | 100 | 0.200 | 1 | 1 | 0.2 | 0.15 | 1.5 | 4 | 0.6 | 0.8 |
| Comparative Example 1 | 100 | 0 | 1 | 1 | 0.2 | 0.15 | 1.5 | 4 | 0.6 | 0.8 |
| Comparative Example 2 | 100 | 0.002 | 1 | 1 | 0.2 | 0.15 | 1.5 | 4 | 0.6 | 0.8 |
| Comparative Example 3 | 100 | 0.005 | 1 | 1 | 0.2 | 0.15 | 1.5 | 4 | 0.6 | 0.8 |
| Comparative Example 4 | 100 | 0.250 | 1 | 1 | 0.2 | 0.15 | 1.5 | 4 | 0.6 | 0.8 |
| Comparative Example 5 | 100 | 0.300 | 1 | 1 | 0.2 | 0.15 | 1.5 | 4 | 0.6 | 0.8 |
| Comparative Example 6 | 100 | 0.400 | 1 | 1 | 0.2 | 0.15 | 1.5 | 4 | 0.6 | 0.8 |

*parts by mole based on 100 parts by mole of the barium titanate main ingredient powder.

Estimation 1: ICP Analysis

An inductively coupled plasma (ICP) analysis was performed on the dielectric layer of the multilayer ceramic capacitor manufactured in the Examples 1 to 7 and the Comparative Examples 1 to 6, the content of the element of phosphorus (P) in the dielectric layer was confirmed, and the result is expressed in Table 2.

The ICP analysis was performed by preparing ten each of the multilayer ceramic capacitors manufactured in the Examples 1 to 7 and the Comparative Examples 1 to 6, and measuring the prepared dielectric layer of the prepared multilayer ceramic capacitor under the conditions of, for example, 12 L/min of a plasma gas flow, 0.2 L/min of an auxiliary gas flow, 0.5 L/min of a nebulizer flow, 1400 W of plasma RF power, and axial of a plasma mode by using equipment of AVIO500 (Perkin Elmer) of the inductively coupled plasma-optical emission spectrometry (ICP-OES) in a quartz chamber.

In Table 2, the content of the element of phosphorus (P) is shown with reference to 100 parts by mole of the barium titanate-based main ingredient in the dielectric layer, and is shown with the maximum values, the minimum values, and their mean values.

TABLE 2

| | Content of element P (Avg.)* | Content of element P (Min.)* | Content of element P (Max.)* |
|---|---|---|---|
| Example 1 | 0.010 | 0.0099 | 0.0101 |
| Example 2 | 0.040 | 0.0400 | 0.0401 |
| Example 3 | 0.070 | 0.0699 | 0.0702 |
| Example 4 | 0.100 | 0.1000 | 1.0001 |
| Example 5 | 0.140 | 0.1401 | 0.1402 |
| Example 6 | 0.170 | 0.1699 | 0.1700 |
| Example 7 | 0.200 | 0.2000 | 0.2001 |
| Comparative Example 1 | 0 | 0 | 0 |
| Comparative Example 2 | 0.002 | 0.0019 | 0.0022 |
| Comparative Example 3 | 0.005 | 0.0048 | 0.0051 |
| Comparative Example 4 | 0.250 | 0.2499 | 0.2500 |
| Comparative Example 5 | 0.300 | 0.2998 | 0.3000 |
| Comparative Example 6 | 0.400 | 0.4000 | 0.4002 |

*The content of P is parts by mole based on 100 parts by mole of the barium titanate-based main ingredient.

The results in Table 2, confirm that in the multilayer ceramic capacitors according to the present embodiment, that the element of phosphorus (P) is included in an amount of 0.006 parts by mole to 0.23 parts by mole in the dielectric layer based on 100 parts by mole of the barium titanate-based main ingredient.

Estimation 2: SEM Analysis

A scanning electron microscope (SEM) analysis was performed on the multilayer ceramic capacitor manufactured in the Examples 1 to 7 and the Comparative Examples 1 to 6, and from this, the size and distribution of the dielectric grains in the dielectric layer were confirmed, and the results are shown in Table 3.

The SEM analysis was performed as follows. The multilayer ceramic capacitor 100 is put in the epoxy mixed solution and is cured, a side (WT side) of the capacitor body 110 in the W-axis and T-axis directions is polished up to the ½ point in the L-axis direction, is fixed, and is maintained at the vacuum atmosphere in a chamber, and the cross-section sample may be obtained to observe the active portion where the dielectric layer 111 crosses the internal electrode layers 121 and 122. The active portion of the cross-section sample was ion milled and was measured using the SEM. The SEM used the Verios G4 product from Thermofisher Scientific, and the measurement conditions were 10 kV, 0.2 Na, and 100 times of the analysis magnification.

The maximum long axis of the one hundred dielectric grains was measured in the SEM image of the measured cross-section sample, a size distribution cumulative curve was created, and the D10, D50 and D90 diameters of the dielectric grains were calculated, respectively. At this time, the D10, D50 and D90 diameters represent the sizes at the points of 10%, 50% and 90%, respectively, in the size distribution cumulative curve.

In Table 3, the coefficient of size variation (CV) of the dielectric grains was calculated by Equation 1.

$$\text{Coefficient of size variation (\%)} = \{\text{Standard deviation } (\sigma) \text{ of size/average}\} \times 100 \quad \text{[Equation 1]}$$

(here, the standard deviation (σ) of size is a square root of the mean value of the squares of deviation.)

TABLE 3

| | D10 (nm) | D50 (nm) | D90 (nm) | CV |
|---|---|---|---|---|
| Example 1 | 120 | 200 | 330 | 31% |
| Example 2 | 120 | 200 | 330 | 31% |
| Example 3 | 120 | 200 | 330 | 31% |
| Example 4 | 120 | 200 | 330 | 31% |
| Example 5 | 120 | 200 | 330 | 31% |
| Example 6 | 120 | 200 | 330 | 31% |
| Example 7 | 120 | 200 | 330 | 31% |
| Comparative Example 1 | 100 | 200 | 380 | 48% |
| Comparative Example 2 | 100 | 200 | 380 | 48% |
| Comparative Example 3 | 100 | 200 | 380 | 48% |
| Comparative Example 4 | 120 | 200 | 330 | 43% |
| Comparative Example 5 | 120 | 200 | 330 | 43% |
| Comparative Example 6 | 120 | 200 | 330 | 43% |

As shown in Table 3, in Examples 1 to 7 in which the element of phosphorus (P) was included in an amount of 0.006 parts by mole to 0.23 parts by mole in the dielectric layer, the coefficient of size variation of the dielectric grains exhibited lower than Comparative Examples 1 to 6. These results demonstrate that the multilayer ceramic capacitor according to the present embodiment has dielectric grains that are uniformly present in the dielectric layer.

Estimation 3: Withstand Voltage Characteristic

Breakdown voltages (BDV) of the multilayer ceramic capacitor manufactured in the Examples 1 to 7 and the Comparative Examples 1 to 6 were measured, and the results are shown in Table 4.

Regarding the breakdown voltage (BDV), fifty each the multilayer ceramic capacitors manufactured in the Examples 1 to 7 and the Comparative Examples 1 to 6 were prepared, a Keithley measuring device model 2410 was used to apply the voltage from OV to 1100V by each 1.00000V according to a sweep method, and the voltage value when the current value became 20 mA was measured as the breakdown voltage value. The breakdown voltage was measured in a silicon oil bath.

Table 4 expresses the minimum values and the mean values of the measured BDV, and the BDV dispersions. The BDV dispersion was calculated as expressed in Equation 2.

$$\text{Dispersion (\%)} = \{\text{standard deviation/average}\} \times 100 \quad \text{[Equation 2]}$$

(here, the standard deviation is the square root of the average of the squares of the deviation.)

TABLE 4

| | BDV mean value (V) | BDV minimum value (V) | BDV dispersion |
|---|---|---|---|
| Example 1 | 413 | 370 | 11% |
| Example 2 | 412 | 380 | 13% |
| Example 3 | 431 | 365 | 12% |
| Example 4 | 409 | 379 | 11% |
| Example 5 | 394 | 373 | 11% |
| Example 6 | 391 | 347 | 13% |
| Example 7 | 402 | 367 | 11% |
| Comparative Example 1 | 312 | 293 | 24% |
| Comparative Example 2 | 337 | 287 | 23% |
| Comparative Example 3 | 399 | 361 | 13% |
| Comparative Example 4 | 393 | 357 | 12% |

TABLE 4-continued

| | BDV mean value (V) | BDV minimum value (V) | BDV dispersion |
|---|---|---|---|
| Comparative Example 5 | 392 | 346 | 11% |
| Comparative Example 6 | 387 | 352 | 12% |

It is found from Table 4 that, in the case of the Examples 1 to 7 in which the element of phosphorus (P) is included in an amount of 0.006 parts by mole to 0.23 parts by mole in the dielectric layer, the breakdown voltage is high and the dispersion is low so the withstand voltage characteristic is excellent On the other hand, it is found that, the breakdown voltage is lower and the dispersion is also higher than in the case of the Examples 1 to 7 in the case of the Comparative Examples 1 and 2, and the breakdown voltage is low in the case of the Comparative Example 6. Meanwhile, it is found that, the withstand voltage characteristic is excellent in the case of the Comparative Examples 3 to 5, but as shown in Evaluation 4 described later, high temperature and harsh reliability and humidity reliability are deteriorated.

Estimation 4: Reliability

A highly accelerated life test (HALT) and a moisture resistance reliability were measured for the multilayer ceramic capacitor manufactured in the Examples 1 to 7 and the Comparative Example 1 to 6, and the results are shown in Table 5.

Specifically, forty each of the multilayer ceramic capacitors manufactured in the Examples 1 to 7 and the Comparative Examples 1 to 6 were prepared and mounted on a measuring substrate, and the HALT was measured in the conditions of 150° C., 150 hours, and 100V by using an ESPEC (PV-222, HALT) device, and the moisture resistance reliability was measured in the conditions of 85° C., 85% of relative humidity (R.H.), 32V, and 24 hours using an ESPEC (PR-3J, 8585) device.

TABLE 5

| | HALT | | Moisture resistance |
|---|---|---|---|
| | Mean time to first failure (h) | Mean time between failures (h) | reliability failure time (h) |
| Example 1 | 69 | 78 | No short |
| Example 2 | 71 | 80 | No short |
| Example 3 | 72 | 81 | No short |
| Example 4 | 68 | 77 | No short |
| Example 5 | 73 | 79 | No short |
| Example 6 | 71 | 82 | No short |
| Example 7 | 70 | 77 | No short |
| Comparative Example 1 | 27 | 51 | No short |
| Comparative Example 2 | 31 | 53 | No short |
| Comparative Example 3 | 35 | 57 | No short |
| Comparative Example 4 | 59 | 66 | 23 |
| Comparative Example 5 | 53 | 60 | 17 |
| Comparative Example 6 | 49 | 58 | 13 |

It is found from Table 5 that, in the case of the Examples 1 to 7 in which the element of phosphorus (P) is included in an amount of 0.006 parts by mole to 0.23 parts by mole in the dielectric layer, the HALT and the moisture resistance reliability and are excellent compared to the Comparative Example 1 to 6.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: multilayer ceramic capacitor
110: capacitor body
111: dielectric layer
121: first internal electrode
122: second internal electrode
131: first external electrode
132: second external electrode

What is claimed is:

1. A multilayer ceramic capacitor comprising:

a capacitor body including a dielectric layer and an internal electrode layer; and an external electrode arranged outside the capacitor body, wherein the dielectric layer includes a barium titanate-based main ingredient and phosphorus (P), phosphorus (P) is included in an amount of 0.040 parts by mole to 0.23 parts by mole based on 100 parts by mole of the barium titanate-based main ingredient, and dysprosium (Dy) is included in an amount of 0.1 parts by mole to 1.0 parts by mole based on 100 parts by mole of the barium titanate-based main ingredient.

2. The multilayer ceramic capacitor of claim 1, wherein the dielectric layer includes a plurality of dielectric grains, and the dielectric grains include the barium titanate-based main ingredient and phosphorus (P).

3. The multilayer ceramic capacitor of claim 2, wherein a D10 diameter of the dielectric grain is 100 nm to 140 nm.

4. The multilayer ceramic capacitor of claim 2, wherein a D50 diameter of the dielectric grain is 150 nm to 250 nm.

5. The multilayer ceramic capacitor of claim 2, wherein a D90 diameter of the dielectric grain is 300 nm to 420 nm.

6. The multilayer ceramic capacitor of claim 2, wherein a coefficient of size variation of the dielectric grains obtained from Equation 1 is 30% to 45%:

$$\text{Coefficient of size variation (\%)} = \{\text{Standard deviation } (\sigma) \text{ of size/average}\} \times 100 \quad \text{[Equation 1]}$$

wherein in Equation 1, the standard deviation (σ) of size is a square root of an average of squares of deviation.

7. The multilayer ceramic capacitor of claim 1, wherein the dielectric layer further includes an accessory ingredient, and the accessory ingredient includes at least one selected from the group consisting of terbium (Tb), manganese (Mn), vanadium (V), barium (Ba), silicon (Si), aluminum (Al), calcium (Ca), and combinations thereof.

8. The multilayer ceramic capacitor of claim 7, wherein based on 100 parts by mole of the barium titanate-based main ingredient, the dielectric layer includes:

terbium (Tb) in an amount of 0.1 parts by mole to 1.0 parts by mole, manganese (Mn) in an amount of 0.01 parts by mole to 0.5 parts by mole, vanadium (V) in an amount of 0.01 parts by mole to 0.5 parts by mole, barium (Ba) in an amount of 0.5 parts by mole to 3.0 parts by mole, silicon (Si) in an amount of 0.5 parts by mole to 4.0 parts by mole, or aluminum (Al) in an amount of 0.1 parts by mole to 1.0 parts by mole calcium (Ca) in an amount of 0.01 parts by mole to 1.0 parts by mole.

9. A method of manufacturing a multilayer ceramic capacitor comprising:

manufacturing dielectric powder by mixing barium titanate-based main ingredient powder including a barium (Ba) precursor and a titanium (Ti) precursor, and a compound containing phosphorus (P);

manufacturing a dielectric green sheet by using dielectric slurry including the dielectric powder, and forming a conductive paste layer on a surface of the dielectric green sheet;

manufacturing a dielectric green sheet stacking by stacking the dielectric green sheet on which the conductive paste layer is formed;

manufacturing a capacitor body including a dielectric layer and an internal electrode layer by sintering the dielectric green sheet stacking; and forming an external electrode on one side of the capacitor body, wherein the compound containing phosphorus (P) is mixed in an amount of 0.006 parts by mole to 0.23 parts by mole based on 100 parts by mole of the barium titanate-based main ingredient powder, the dielectric layer includes the barium titanate-based main ingredient and phosphorus (P), and the compound containing phosphorus (P) includes phosphorus pentoxide ($P_2O_5$), phosphoric acid ($H_3PO_4$), phosphoryl chloride ($POCl_3$), a hydrocarbon compound containing phosphorus, or combinations thereof.

10. The method of claim 9, wherein the hydrocarbon compound containing phosphorus includes a phosphate compound, a phosphite compound, a phosphonate compound, a phosphinate compound, or combinations thereof.

11. The method of claim 9, wherein the manufacturing dielectric powder further includes, after mixing the barium titanate-based main ingredient powder and the compound containing phosphorus (P) to prepare a mixture, optionally drying and dry grinding the mixture obtained by the mixing, optionally calcinating a pulverized material obtained by the dry grinding, optionally wet grinding a calcinated material obtained by the calcinating, and optionally drying and dry grinding a pulverized material obtained by the wet grinding.

12. The method of claim 11, wherein the calcination is performed at a temperature of 800° C. to 1000° C.

13. The method of claim 9, wherein the dielectric slurry further includes accessory ingredient powder, and the accessory ingredient powder includes at least one selected from the group consisting of dysprosium oxide ($Dy_2O_3$), terbium oxide ($Tb_2O_3$), manganese oxide ($MnO_2$), vanadium oxide ($V_2O_5$), barium carbonate ($BaCO_3$), silicon dioxide ($SiO_2$), aluminum oxide ($Al_2O_3$), calcium carbonate ($CaCO_3$), and combinations thereof.

14. The method of claim 13, wherein based on 100 parts by mole of the barium titanate-based main ingredient powder, the accessory ingredient powder includes:

dysprosium oxide ($Dy_2O_3$) in an amount of 0.1 parts by mole to 1.0 parts by mole, terbium oxide ($Tb_2O_3$) in an amount of 0.1 parts by mole to 1.0 parts by mole, manganese oxide ($MnO_2$) in an amount of 0.01 parts by mole to 0.5 parts by mole, vanadium oxide ($V_2O_5$) in an amount of 0.01 parts by mole to 0.5 parts by mole, barium carbonate ($BaCO_3$) in an amount of 0.5 parts by mole to 3.0 parts by mole, silicon dioxide ($SiO_2$) in an amount of 0.5 parts by mole to 4.0 parts by mole, aluminum oxide ($Al_2O_3$) in an amount of 0.1 parts by mole to 1.0 parts by mole, or calcium carbonate ($CaCO_3$) in an amount of 0.01 parts by mole to 1.0 parts by mole.

* * * * *